United States Patent [19]

Sharp

[11] Patent Number: 5,060,179
[45] Date of Patent: Oct. 22, 1991

[54] MATHEMATICAL FUNCTION-GENERATING DEVICE FOR ELECTRONIC MUSICAL INSTRUMENTS

[75] Inventor: Paul H. Sharp, Aloha, Oreg.

[73] Assignee: Roland Corporation, Osaka, Japan

[21] Appl. No.: 436,540

[22] Filed: Nov. 14, 1989

[51] Int. Cl.$^5$ .............................................. G06F 1/02
[52] U.S. Cl. ...................................... 364/718; 84/647
[58] Field of Search ........................... 364/718; 84/647

[56] References Cited

U.S. PATENT DOCUMENTS

| | | | |
|---|---|---|---|
| 4,333,159 | 6/1982 | Bigall et al. | 84/647 |
| 4,424,730 | 1/1984 | Ezawa | 364/718 |
| 4,701,871 | 10/1987 | Sasaki et al. | 364/718 |

FOREIGN PATENT DOCUMENTS 61-3436 2/1986 Japan.

*Primary Examiner*—Gary V. Harkcom
*Assistant Examiner*—Long T. Nguyen
*Attorney, Agent, or Firm*—William A. Birdwell

[57] ABSTRACT

A mathematical function-generating device for producing, in an electronic musical instrument, functional values from an accumulation of first digital data. A digital data-generating circuit generates first digital data. A digital value string-generating circuit generates a bit-reversed digital value which increments a predetermined amount each time a first digital data unit is generated and which corresponds to a predetermined number of least significant bits in said first digital data unit. An adder is provided for adding the first digital data to a digital value comprising an accumulated value truncated to a predetermined number of least significant bits and having the bit reversed digital data concatenated thereto, thereby producing a new accumulated value. A memory is provided for storing and truncating each new accumulated value. The memory also supplies the adder with the new accumulated value. The first digital data corresponds to gradients of a linear or exponential curve and may be used as address signals to read waveform data from a memory. The accumulated values give functional values of that curve, which may represent an envelope waveform.

7 Claims, 5 Drawing Sheets

FIG. 3

| DECIMAL | BINARY |
|---|---|
| 0 | 0 0 0 |
| 1 | 0 0 1 |
| 2 | 0 1 0 |
| 3 | 0 1 1 |
| 4 | 1 0 0 |
| 5 | 1 0 1 |
| 6 | 1 1 0 |
| 7 | 1 1 1 |

| BINARY | DECIMAL |
|---|---|
| 0 0 0 | 0 |
| 1 0 0 | 4 |
| 0 1 0 | 2 |
| 1 1 0 | 6 |
| 0 0 1 | 1 |
| 1 0 1 | 5 |
| 0 1 1 | 3 |
| 1 1 1 | 7 |

FIG. 4

| Y \ X | 000 | 001 | 010 | 011 | 100 | 101 | 110 | 111 |
|---|---|---|---|---|---|---|---|---|
| 0 0 0 | — | — | — | — | — | — | — | — |
| 1 0 0 | — | — | — | — | ○ | ○ | ○ | ○ |
| 0 1 0 | — | — | — | — | — | — | ○ | ○ |
| 1 1 0 | — | — | ○ | ○ | ○ | ○ | ○ | ○ |
| 0 0 1 | — | — | — | — | — | — | — | ○ |
| 1 0 1 | — | — | — | ○ | ○ | ○ | ○ | ○ |
| 0 1 1 | — | — | — | — | — | ○ | ○ | ○ |
| 1 1 1 | — | ○ | ○ | ○ | ○ | ○ | ○ | ○ |

MATHEMATICAL FUNCTION-GENERATING DEVICE FOR ELECTRONIC MUSICAL INSTRUMENTS

BACKGROUND OF THE INVENTION

1. Field of the Invention

The invention relates to a mathematical function-generating device for electronic musical instruments which device is adapted to generate mathematical function values which are accumulated values obtained by sequentially accumulating digital data, and in particular, to a mathematical function-generating device adapted to generate address signals used to read waveform data from a waveform memory, or adapted for generation of envelope waveforms.

2. Description of Prior Art

An example of such a mathematical function-generating device, which is utilized in such an address signal-generating apparatus that generates address signals used for the reading of waveform data from a waveform memory on the basis of musical tones which are to be generated, is known as disclosed in, for instance, Japanese Patent Publication Sho. 59-17838. The device as disclosed in said Publication will be explained below referring to FIG. 8.

Digital data are produced by a frequency information-generating circuit 81 when keys are depressed one after another. Each of the digital data comprises such a decimal or fraction part as those in fixed point numerals and represents a frequency of musical tone that is to be generated corresponding to the depressed key, the frequency in turn showing a pitch of the musical tone. Said digital data is then given to an adding circuit 82 as one of input data thereof. The adding circuit 82 is supplied with further input data from a memory circuit 83, which data is a value resulting from a previous adding processing in the said adding circuit 82 per se, and thus is a kind of accumulated value. The further input data from said memory circuit is also a digital data similarly containing the fraction part and is added to the one input data from said frequency information-generating circuit. A result of this addition is written as a new accumulated data into the memory circuit 83 so that the new accumulated data is substituted for the existing accumulated data.

Each of the accumulated data is a digital value which comprises an integer part and a fraction part and is used as an address signal. To be exact, the integer part of the accumulated value is utilized as said address signal in order to read musical tone amplitudes from the waveform memory. The amplitudes thus read are then interpolated based on the fraction parts so that an actual musical tone may be reproduced.

SUMMARY OF THE INVENTION

It is however to be noted that, in said known mathematical function-generating device, highly accurate address signals as one type of such digital functional data can be produced only if multi-digit functional values are stored in a memory without being subjected to any additional treatment. This causes a higher cost due to a larger capacity of memory which has to store the unchanged multi-digit functional data.

Therefore, it is an object of the present invention to provide a mathematical function-generating device which, notwithstanding its smaller capacity of memory, can generate functional data of high accuracy for electronical musical instruments in such a manner that its memory cost may be reduced to resolve the aforementioned drawback.

In order to accomplish this object, the mathematical function-generating device for electronical musical instruments comprises:

(a) digital data-generating means for generating first digital data each being a bit string comprising a predetermined number of digits;

(b) digital value string-generating means for generating bit-reversed digital value strings which as second digital data are varying in cyclic shift and correspond to a predetermined number of trailing bits in the first digital data generated by the digital data-generating means;

(c) adding means for adding the first digital data generated by the digital data-generating means to each of the digital values which comprises the bit string constituting the accumulated value and has a predetermined number of trailing bits which are completed with the second digital data generated by the digital value string-generating means; and (d) memory means adapted to store a new accumulated value in place of the accumulated value which has been added in the adding means to produce a sum, the new accumulated value being a bit string produced by eliminating the predetermined number of trailing bits from the sum, the memory means also adapted to supply the adding means with the new accumulated value.

In operation, the concatenation of the digital value "C" (i.e., accumulated value) and the second digital data "B" from digital value string-generating means, is added to the first digital data "A" produced in the digital data-generating means, as shown in FIG. 1.

Each string of the second digital data produced by the digital value string-generating means is a digital value comprising a bit string composed of such bits that are included in each of different digital values in cyclic shift and arranged in a bit-reverse order. Consequently, carries take place in a discrete manner in the course of time, in the adding processing wherein the bit-reversed digital values are dealt with.

According to the invention, any distortion or offset in carries is avoided although there are employed as functional values such an accumulated value which is obtained by eliminating the predetermined number of trailing bits included in the sum. This effect is produced due to said carries which, as mentioned above, take place in a time-discrete manner when addition is carried out as to the trailing bits in the accumulated value.

Therefore, highly accurate functional values are produced by virtue of the correction made to prevent said distortion or offset in the carries, notwithstanding a lower cost for memory device having a capacity reduced by the eliminated trailing bits in the sum. The digital value string-generating means ma be composed by employing a bit-reversed counter.

The first digital data which are generated in the digital data-generating means may be utilized to sequentially read waveform data from a waveform memory, corresponding to frequencies of musical tones which are to be generated. The aforementioned accumulated values are used as address signals for the reading of waveform data. Further, the first digital data generated in said digital data-generating means may be regarded to be linear or exponential gradients so that said accumulated values may be used as values given by a linear or exponential function. Such linear or exponential functional values may represent such values as defined in a mathematical function of envelope waveforms.

BRIEF DESCRIPTION OF THE DRAWINGS

The present invention will become more apparent from the following description and the accompanying drawings, in which:

FIGS. 2 to 4 detailedly illustrate the device, i.e., a mathematical function-generating device for electronic musical instruments in a first embodiment of the invention, wherein;

FIG. 2 is a block diagram in the first embodiment;

FIG. 3 shows digital data strings generated by a bit-reversed counter BRC in the first embodiment; and FIG. 4 illustrates such carries as taking place in the device in the first embodiment;

FIGS. 5 to 7 illustrate another mathematical function-generating device for electronic musical instruments in a second embodiment of the invention, wherein;

FIG. 5 is a block diagram in the second embodiment;

FIG. 6 is a graph of envelope waveform in the second embodiment; and

FIG. 7 is another envelope waveform graph in a modification of the second embodiment.

DETAILED DESCRIPTION OF THE PREFERRED EMBODIMENT

Figure 1:
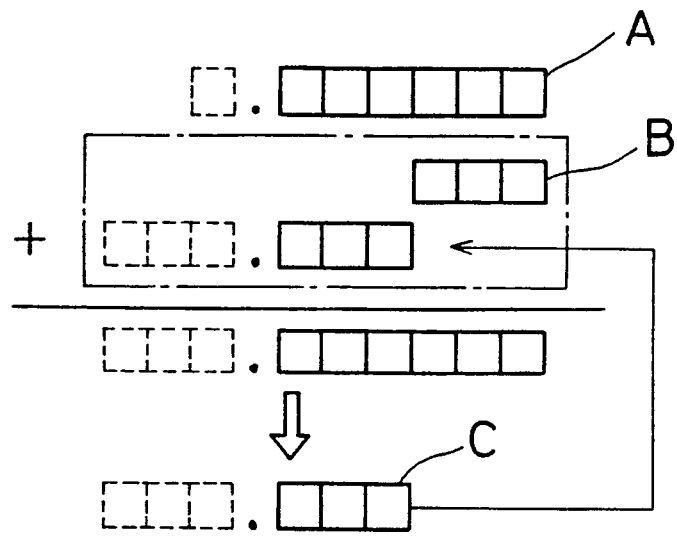
FIG. 1 illustrates a basic function of a device defined in the claims.

Mathmatical function-generating devices in the preferred embodiments of the invention will now be explained referring to the drawings.

First Embodiment

In this embodiment, a mathematical function-generating device for electronic musical instruments is applied to an address signal-generating apparatus for electronic musical instruments wherein waveform data are read from a waveform memory in accordance with frequencies of musical tones which are to be generated. The address signal-generating device produces such address signals that are used in reading said waveform data.

Figure 2:
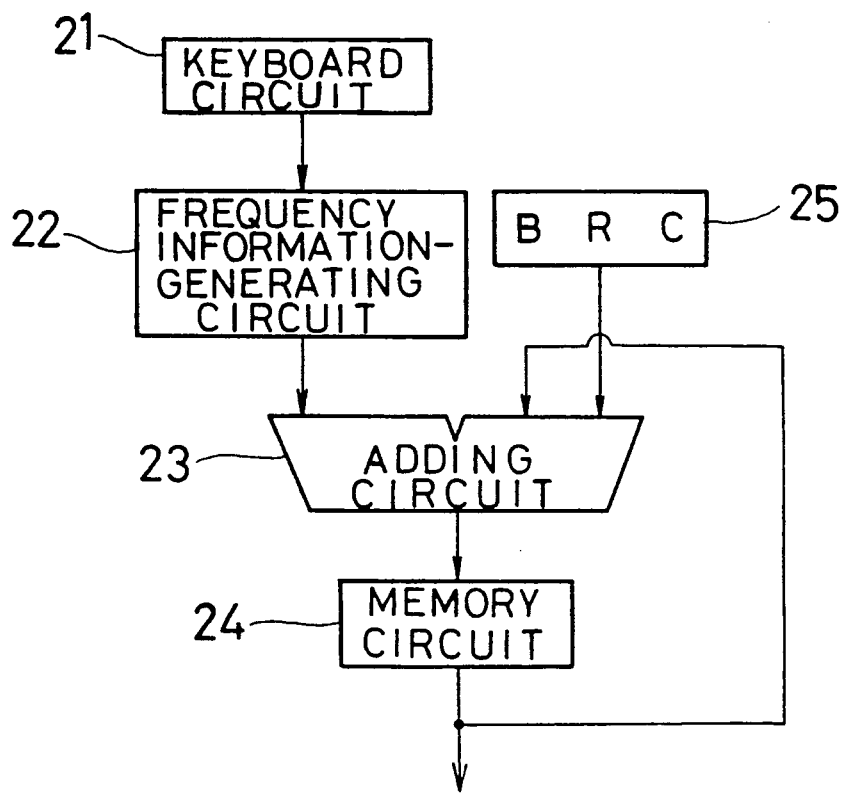

As shown in FIG. 2, when a key on a keyboard is depressed, a keyboard circuit 21 produces a key-on signal as well as a musical note signal which represents a pitch of the key. The musical note signal is given to a frequency information-generating circuit 22. Digital data (i.e., frequency constants) which are frequency data respectively corresponding to pitches of musical tones that are to be generated have previously been written in the frequency information-generating circuit 22, wherein each of said digital data comprises an integer part of, for instance 12 (twelve) bits and a fraction part of, for instance 10 (ten) bits.

The key-on signal and the musical note signal from the keyboard circuit 21 are thus used to read a correct digital data which corresponds to the musical note pitch of the depressed key from the frequency information-generating circuit 22, the correct digital data being one of inputs to an adding circuit 23.

The other input to the adding circuit 23 is a digital value stored in and delivered from a memory circuit 24. The digital value from the memory circuit is a result of a previous addition in the adding circuit 23, in other words an accumulated value consisting of integer part of 12 bits and fraction part of 7 (seven) bits. Further, a digital data string consisting of 3 three bits produced in a bit-reversed counter 25 is also supplied to the adding circuit 23 in such a manner as to complete a trailing portion of the fraction part of 7 bits mentioned above.

In this way, a vacant space trailing from the seventh bit in the fraction part of digital value is filled with the three bits of the digital data string from the bit-reversed counter 25. The concatenation thus produced has 10 bits and is comparable in length with the digital data from the frequency information-generating circuit.

Decimal figures ... 0, 1, 2, ... 7, 0, 1, 2, ... which are digital values sequentially altering in a cyclic shift in a direction of an arrow in FIG. 3 and shown at left-hand side thereof are converted by the bit-reversed counter 25 into a different string of digital values having a reversed order of bits as shown at a right-hand side of FIG. 3. These digital values in the different string incrementally vary in the direction of arrow in FIG. 3 at each time when addition is executed in the adding circuit 23.

Each of the addition results in the adding circuit 23 is changed in its bit configuration to have 12 bits in an integer part and 7 bits in a fraction part. Thereafter, said addition result is written into the memory circuit 24 as a new accumulated value which is substituted for the existing accumulated value.

It will now be apparent that the digital values written in the memory circuit 24 have a length of record which is shorter by three bits than the digital data produced in the frequency information-generating circuit 22. Accordingly, the capacity of the memory circuit 24 can be made smaller by three bits for each musical tone-generator incorporated in the electronic musical instrument. If 16 (sixteen) musical tone-generators are employed therein, then 48 (forty-eight) (the product of 3 and 16) bits ca be dispensed with in the capacity of memory circuit.

On the other hand, a memory of waveform (not shown in the drawings) is provided in relation to the device herein described, and amplitude values of waveform written in the memory of waveform are read therefrom by using the digital accumulated values in said memory circuit 24 as address signals, to be exact, by using the integer parts of twelve bits included in said accumulated values. The fraction parts of seven bits contained therein are used to execute interpolation on the thus read amplitude values of waveform, in such a known manner as disclosed in the Japanese Patent Publication Sho. 59-17838.

Added to the three trailing bits "X" in the fraction part of the digital data produced in the frequency information generating circuit 22 as shown in FIG. 4 are the string of digital data "Y" also having a record length of three bits and produced in the bit-reversed counter 25. The circle denotes carries which result from the sequential additions of the digital data "Y" to the three bits "X" which additions go on stepwise in a direction shown at an arrow in FIG. 4. As is apparent from FIG. 4, the carries take place discretely in the course of time.

Two, four or more trailing bits in the fraction part of the accumulated digital values may be completed with the same respective number of bits in digital value strings produced by the bit-reversed counter 25, instead of three trailing bits being completed with three bits from said counter as in the aforementioned embodiment.

The various circuits constituting the device described hereinbefore may be any proper circuits. As for the adding circuit 23, it can be easily manufactured because, in a case wherein the bit-reversed counter 25 is a kind of hardware, said counter is such that the bits in ordinary counters are simply rearranged in a reverse order.

If a greater number of trailing bits in the fraction part of accumulated value written in the memory circuit 24 are to be completed with the output from the bit reverse counter 25, then additional wires may simply be connected to the adding circuit 23 at input terminals thereof corresponding to increased bits.

Second Embodiment

In this second embodiment a mathematical function-generating device in the invention is applied to an envelope signal-generating apparatus in electronic musical instruments. The mathematical function-generating device in this case is so designed that it produces envelope waveform data which are represented by an exponential curve and thus are defined by an exponential function. The same numerals as those in the first embodiment denote the same members, therefore detailed descriptions thereof are not repeated below.

Figure 5:
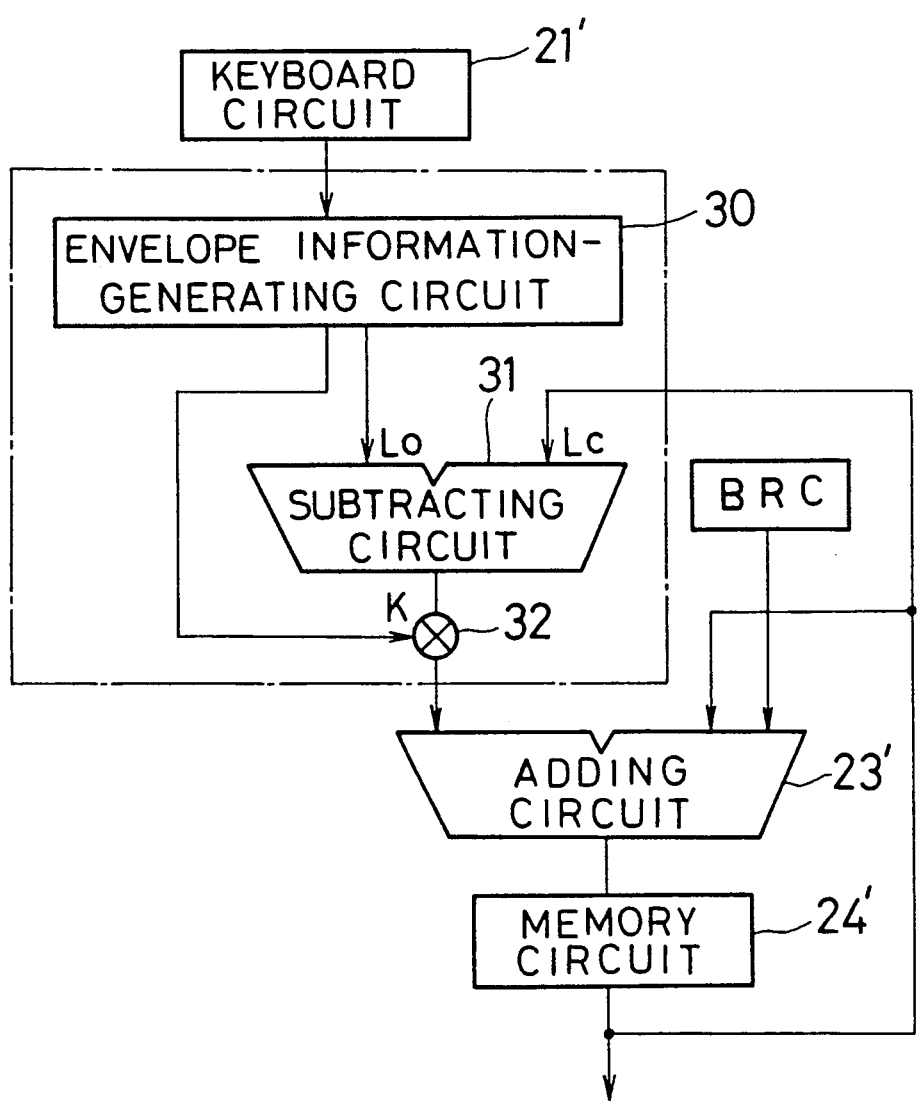

As shown in FIG. 5, a keyboard circuit 21' in this embodiment produces key-on/-off signals and initial-/after-touch signals which are given to an envelope information-generating circuit 30. The former signals represent key-depression per se or key-release per se on a keyboard, the latter signals showing manners or conditions, for instance speeds, of said key-depression or key-release. The envelope information-generating circuit 30 is provided with envelope constants "Lo" and coefficients "K" which are previously written in said circuit 30. Each of the envelope constants "Lo" comprises an integer part composed of, for instance 4 (four) bits as well as a fraction part composed of, for instance 8 (eight) bits. Each of the coefficients "K" ($0 < K < 1$) comprises a fraction part composed of, for instance 3 (three) bits and cooperates with said envelope constants "Lo" so as to produce envelope waveforms which are shown by an exponential curve. A proper envelope constant "Lo" and a proper coefficient "K" are selected and read from the envelope information-generating circuit 30 based on the key-on/-off and initial-/after-touch signals from the keyboard circuit 21'. Said selected envelope constant "Lo" is given to one of input ports of a subtracting circuit 31. Delivered to the other input port of the subtracting circuit 31 is a digital value "Lc" which has been written into and stored in a memory circuit 24'. The digital value "Lc" is an accumulated value obtained in a previous run of such a routine as shown in FIG. 5, and comprises an integer part of, for instance 4 (four) bits and a fraction part of, for instance 8 (eight) bits. Said digital value "Lc" as the accumulated value is subtracted from the envelope constant "Lo" in the subtracting circuit 31 to thereby give a difference which is then supplied to a multiplying circuit 32 so as to be multiplied by the coefficient "K". A product obtained thereby is delivered to one of input ports of an adding circuit 23'. The details other than those described above are similar to those in the first embodiment.

Accordingly, a new accumulated value "Lc+1" which is written in the memory circuit 24' in a sequential manner will be expressed by the following formula.

$$Lc+1 \leftarrow (Lo-Lc) \times K + Lc$$

Figure 6:
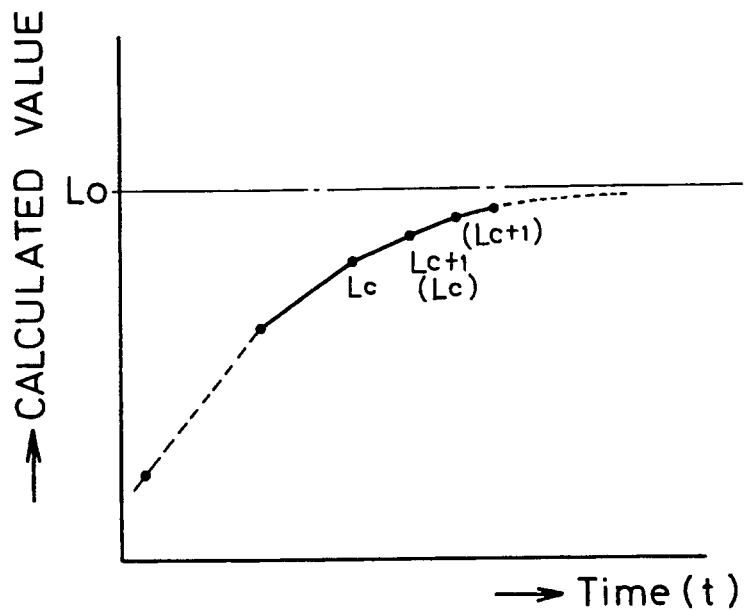

It is of course that the new accumulated value "Lc+1" shall be treated with in the next run as the existing accumulated value "Lc" which has been resulted from the previous runs of said routine in FIG. 5. These accumulated values "Lc" are plotted as in FIG. 6 in the course of time "t" to give an envelope waveform as an exponential curve.

The above-described envelope information-generating circuit 30, subtracting circuit 31 and multiplying circuit 32 constitute as a whole the digital data-generating means in the invention. The multiplication products in the multiplying circuit 33 give gradients along the exponential curve.

Figure 7:
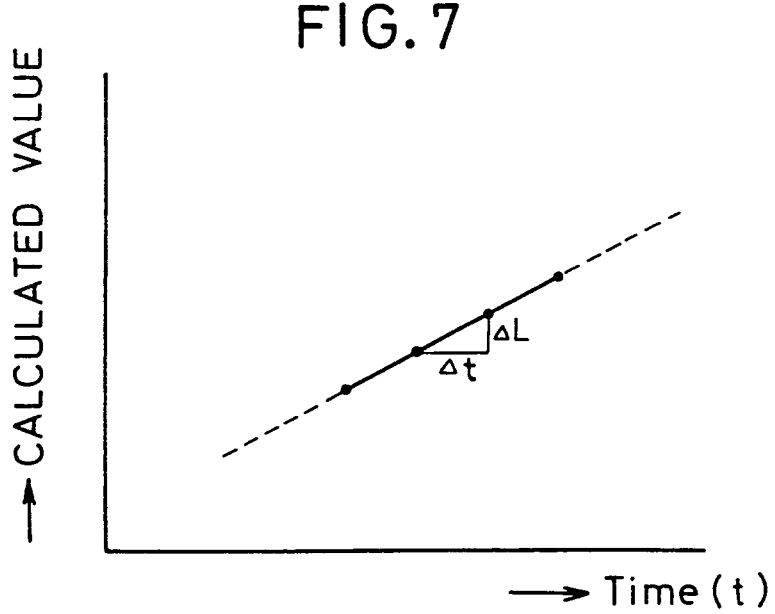
Figure 8:
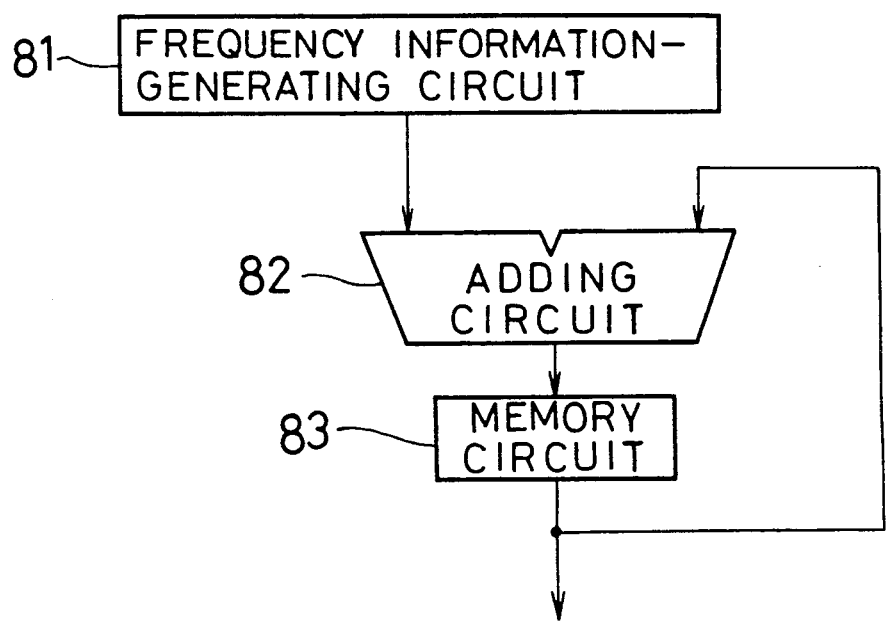
FIG. 8 is a block diagram in prior art.

In a modification of the second embodiment, digital data ($\Delta L$) each of which comprises an integer part of, for instance 4 (four) bits as well as a fraction part of 12 (twelve) bits are directly given by the envelope information-generating circuit 31 to one of input ports of the adding circuit 23'. Each of the digital data ($\Delta L$) indicates an inclination of a straight line and is accumulated at a regular interval of time ($\Delta t$) whereby a linear envelope waveform is given by the thus accumulated values, as shown in FIG. 7.

I claim:

1. A mathematical function-generating device for producing, in a musical instrument, functional values based on accumulated digital data which are produced by sequentially adding first digital data to said accumulated digital data, truncated by a predetermined number of least significant bits and concatenated with a bit-reversed digital value string having said predetermined number of bits, the device comprising:
   (a) a digital data-generating circuit for generating said first digital data, each data unit thereof being a bit string comprising a predetermined number of digits;
   (b) digital value string-generating means for generating said bit-reversed digital value string which increments a predetermined amount each time a first digital data unit is generated and which corresponds to said predetermined number of least significant bits in said first digital data unit generated by said digital data-generating means;
   (c) an adder coupled to said digital data-generating circuit and responsive to said digital value string-generating means for adding said first digital data generated by said digital data-generating means to each said truncated accumulated value concatenated with said bit-reversed digital value string to produce a sum thereof; and
   (d) a memory circuit coupled to said adder for storing a new accumulated value in place of the accumulated value which has been added in the adder to produce said sum, said new accumulated value being a bit string produced by truncating said new accumulated value by said predetermined number of least significant bits, and for supplying said adder with said new accumulated value.

2. A mathematical function-generating device as defined in claim 1, wherein said first digital data generated in said digital data-generating circuit are presented as memory address values for sequentially reading waveform data from a waveform memory, the waveform data corresponding to frequencies of musical tones which are to be generated.

3. A mathematical function-generating device as defined in claim 1, wherein said first digital data generated in said digital data-generating circuit represent gradients of a linear graph so that said accumulated values are utilized as functional values of the linear graph.

4. A mathematical function-generating device as defined in claim 3, wherein the functional values of the linear graph are functional values of envelope waveforms.

5. A mathematical function-generating device as defined in claim 1, wherein said first digital data generated in said digital data-generating circuit represent gradients of an exponential curve so that said accumulated values are utilized as functional values of said exponential curve.

6. A mathematical function generating device as defined in claim 5, wherein said functional values of said exponential curve are functional values of an envelope waveform.

7. A mathematical function-generating device for producing, in a musical instrument, functional values based on accumulated digital data which are produced by sequentially adding first digital data to said accumulated digital data, truncated by a predetermined number of least significant bits and concatenated with a bit-reversed digital value string having said predetermined number of bits, the device comprising:

(a) digital data-generating means for generating said first digital data, each data unit thereof being a bit string comprising a predetermined number of digits;

(b) a bit-reversed counter for generating said bit-reversed digital value string which increments a predetermined amount each time a first digital data unit is generated and which corresponds to said predetermined number of least significant bits in said first digital data unit generated by said digital data-generating means;

(c) adding means for adding said first digital data generated by said digital data-generating means to each said truncated accumulated value concatenated with said bit-reversed digital value string to produce a sum thereof; and (d) memory means for storing a new accumulated value in place of the accumulated value which has been added in the adding means to produce said sum, said new accumulated value being a bit string produced by truncating said new accumulated value by said predetermined number of least significant bits, and for supplying said adding means with said new accumulated value.

* * * * *